US010088051B2

(12) United States Patent
Jordan et al.

(10) Patent No.: US 10,088,051 B2
(45) Date of Patent: Oct. 2, 2018

(54) SEALING ARRANGEMENT WITH PRESSURE-ACTIVATABLE PRETENSIONING ELEMENT

(71) Applicant: Trelleborg Sealing Solutions Germany GmbH, Stuttgart (DE)

(72) Inventors: Holger Jordan, Neuhausen auf den Fildern (DE); Eric Seeling, Marbach am Neckar (DE)

(73) Assignee: TRELLEBORG SEALING SOLUTIONS GERMANY GMBH, Stuttgart (DE)

( * ) Notice: Subject to any disclaimer, the term of this patent is extended or adjusted under 35 U.S.C. 154(b) by 0 days.

(21) Appl. No.: 15/441,163

(22) Filed: Feb. 23, 2017

(65) Prior Publication Data

US 2017/0159821 A1 Jun. 8, 2017

Related U.S. Application Data

(63) Continuation of application No. PCT/EP2015/069537, filed on Aug. 26, 2015.

(30) Foreign Application Priority Data

Sep. 1, 2014 (DE) .................. 10 2014 217 392

(51) Int. Cl.
*F16J 9/00* (2006.01)
*F16J 15/3208* (2016.01)
(Continued)

(52) U.S. Cl.
CPC ....... *F16J 15/3208* (2013.01); *F15B 15/1452* (2013.01); *F16F 9/368* (2013.01);
(Continued)

(58) Field of Classification Search
CPC .... F16J 15/3208; F16J 15/164; F16J 15/3228; F16J 15/48; F16J 15/56; F16J 9/00; F15B 15/1452; F16F 9/368; F16F 2230/30
(Continued)

(56) References Cited

U.S. PATENT DOCUMENTS

| 3,143,757 A | 8/1964 | Quinn |
| 3,608,911 A | 9/1971 | Prasse et al. |

(Continued)

FOREIGN PATENT DOCUMENTS

| DE | 1951970 A1 | 6/1970 |
| DE | 3606886 A1 | 9/1987 |

(Continued)

*Primary Examiner* — Nathan Cumar
(74) *Attorney, Agent, or Firm* — Hackler Daghighian Martino & Novak

(57) ABSTRACT

A sealing arrangement includes a first and a second machine part movable relative to each other along a motional axis. A sealing element is arranged in a press fit in a plurality of grooves of a seal-holding structure of the first machine part. A sealing lip of the sealing element extends away from the seal-holding structure in the axial direction. A pretensioning element is disposed in a retaining groove of the first machine part. The sealing lip is pretensioned against a sealing surface of the second machine part in order to seal off a high-pressure region. The retaining groove has a wedge guide surface for the pretensioning element, which wedge guide surface is arranged running obliquely at an angle α, where α<90°, to the motional axis. The pretensioning element is movable against and along the wedge guide surface to pretension the sealing lip against the sealing surface.

11 Claims, 3 Drawing Sheets

(51) Int. Cl.
*F16F 9/36* (2006.01)
*F15B 15/14* (2006.01)
*F16J 15/16* (2006.01)
*F16J 15/3228* (2016.01)
*F16J 15/48* (2006.01)
*F16J 15/56* (2006.01)

(52) U.S. Cl.
CPC ......... *F16J 15/164* (2013.01); *F16J 15/3228* (2013.01); *F16J 15/48* (2013.01); *F16J 15/56* (2013.01); *F16F 2230/30* (2013.01)

(58) Field of Classification Search
USPC .......................................... 277/467, 581, 589
See application file for complete search history.

(56) References Cited

U.S. PATENT DOCUMENTS

| | | | | |
|---|---|---|---|---|
| 3,730,305 A | * | 5/1973 | Fouts | F16F 9/3214 188/322.15 |
| 4,178,899 A | * | 12/1979 | Julich | F16J 1/02 123/193.6 |
| 4,523,765 A | | 6/1985 | Heidemann | |
| 4,889,349 A | * | 12/1989 | Muller | F16J 15/3208 277/556 |
| 5,392,692 A | * | 2/1995 | Rao | F16J 9/16 277/442 |
| 5,520,092 A | * | 5/1996 | Iida | F16F 9/368 92/155 |
| 6,283,478 B1 | * | 9/2001 | Kumai | F16J 9/062 277/435 |
| 2014/0353915 A1 | | 12/2014 | Jordan | |

FOREIGN PATENT DOCUMENTS

| | | |
|---|---|---|
| DE | 33 20 515 C1 | 12/1988 |
| DE | 39 40 005 A1 | 6/1991 |
| DE | 19903735 A1 | 8/2000 |
| DE | 10352674 A1 | 6/2005 |
| DE | 10 2012 202 571 A1 | 8/2013 |
| DE | 10 2012 218 358 A1 | 4/2014 |
| JP | 58-012784 | 1/1983 |
| JP | H0446274 A | 2/1992 |
| JP | 2008-157333 | 7/2008 |
| WO | 9513206 A1 | 5/1995 |
| WO | 2013 124192 A1 | 8/2013 |

* cited by examiner

SEALING ARRANGEMENT WITH PRESSURE-ACTIVATABLE PRETENSIONING ELEMENT

CROSS-REFERENCE TO RELATED APPLICATIONS

This continuation application claims priority to PCT/EP2015/069537 filed on Aug. 26, 2015 which has published as WO 2016/034474 A1 and also the German application number 10 2014 217 392.2 filed on Sep. 1, 2014, the entire contents of which are fully incorporated herein with these references.

DESCRIPTION

Field of the Invention

The invention relates to a sealing arrangement having a first machine part and having a second machine part, wherein the two machine parts are arranged at a distance apart, with the formation of a sealing gap, such that they are movable relative to each other along a motional axis. The sealing arrangement comprises a sealing element having a sealing lip, which sealing element is arranged held in a seal-holding structure of one of the two machine parts, wherein the sealing lip extends away from the seal-holding structure in the axial direction. A pretensioning element serves to pretension the sealing lip against a sealing surface of the second machine part in order to seal off a high-pressure region from a low-pressure region of the sealing arrangement. The pretensioning element is disposed in a retaining groove of the first machine part.

Background of the Invention

In many technical applications, for instance in vibration dampers, hydraulic actuators, servo cylinders, or spring mountings in the field of two-wheeled technology, sealing arrangements of this type are established and have become known, for instance, from DE 10 2012 218 358 A1.

The service lives of the sealing arrangements are critically dependent on the wearing of the built-in sealing element. A factor which is relevant to the wearing of the sealing element is here the friction of the sealing lip of the sealing element, which sealing lip bears against the sealing surface of the second machine part. In a number of technical applications, the sealing arrangement, in the installation state, is actuated only seldom, i.e. sporadically, though the two machine parts are moved continually during service under a no-load operation. This is the case, for instance, in so-called cab tilt cylinders for tilting and, where appropriate, holding the tilted driver's cab of a truck in relation to a vehicle frame. Regardless of their fatigue stress during no-load operation, such sealing arrangements must be ready for use when needed and must ensure a sufficient sealing capacity.

The object of the invention is to refine a sealing arrangement stated in the introduction such that it has an improved service life combined with low production costs, and at the same time is suitable for high and extreme pressure applications. The seal should, in particular, also be suitable for a no-load operation as described above.

SUMMARY OF THE INVENTION

The object according to the invention is achieved by a sealing arrangement having the features defined in patent claim 1. Advantageous embodiments of the invention are defined in the dependent claims.

In the sealing arrangement according to the invention, the pretensioning element, or that end face of the pretensioning element which is facing toward the high-pressure region, due to the fluidic connection of the retaining groove to the high-pressure region, is subjected to that operating pressure of a working medium, in particular of a working fluid, which prevails in the high-pressure region. The pretensioning element is thereby pressed in the retaining groove, in the direction of the motional axis, against the and along the wedge guide surface and, insofar as the pretensioning element is elastically deformable, is deformed upon contact with the wedge guide surface. The pretensioning element consequently forces the sealing lip of the sealing element against the sealing surface of the second machine part with a contact pressing force derived from the respective operating pressure. This means that the sealing capacity of the sealing element can be controlled by the operating pressure prevailing in the high-pressure region of the sealing arrangement. The sealing lip bears against the sealing surface of the second machine part, in other words with a contact pressure which, at least over a defined operating pressure range, changes in the same direction as the operating pressure prevailing in the high-pressure region of the sealing arrangement. If that operating pressure of the sealing arrangement which prevails in the high-pressure region and which has to be sealed off from the low-pressure region by means of the sealing element rises, then the contact pressing force with which the sealing lip of the sealing element is pressed (pretensioned) by the pretensioning element against the sealing surface of the second machine part also rises, and vice versa. As a result, a required dynamic sealing capability of the sealing element can be realized in a very simple manner in design terms. Furthermore, the sealing arrangement is particularly highly suitable for the technical applications set out in the introduction, in which the two machine parts of the sealing arrangement are continually passively shifted relative to each other without the sealing arrangement actually being actuated (activated). In the sealing arrangement according to the invention, the friction between the sealing lip and the sealing surface of the second machine part, for just such a "no-load operation" of the sealing arrangement, can be minimized in that the sealing lip makes contact with the sealing surface, in the non-pressurized operating state of the sealing arrangement, without contact pressure or pretensioning, or with only slight contact pressure. Unnecessary wearing of the sealing element can hence be reliably prevented, even in the case of high accelerations or motional velocities of the two machine parts relative to each other. Since the seal-holding structure comprises one or more grooves, in which the sealing element is arranged held in a press fit, the sealing element can be easily pressed into the grooves of the seal-holding structure. This is advantageous from production engineering aspects. In the case of a sealing element configured as a radial sealing element, this can be realized, for instance, via an assembly pin introduced into the first machine element. The sealing arrangement according to the invention has a simple design structure and, moreover, is relatively cheap to produce due to the small number of its components.

According to the invention, the wedge guide surface is preferably arranged running obliquely at an angle $\alpha$, where $20° \leq \alpha \leq 80°$, to the sealing surface. The smaller is the angle $\alpha$, the more sensitive is the response of the sealing arrangement to changes in operating pressure.

According to a preferred embodiment of the invention, the wedge guide surface can have at least two longitudinal portions, which are arranged running obliquely, with different angles α, to the sealing surface. The response of the sealing arrangement can hence be set, for instance, in accordance with the requirement. Thus the wedge guide surface can have, for instance, a first longitudinal portion facing toward the high-pressure region and having a lesser first incline in relation to the sealing surface, and a second longitudinal portion adjoining said first longitudinal portion and having a greater second incline in relation to the first incline.

With a view to a lowest possible friction between the sealing lip and the sealing surface in that no-load operation of the sealing arrangement which is mentioned in the introduction, it has proved advantageous if the pretensioning element is dimensioned such that the sealing element, in the non-pressurized state of the high-pressure region, bears against the sealing surface without a pretensioning or with a defined (basic) pretensioning. In the latter case, the (basic) pretensioning is preferably chosen sufficiently small that the generated friction between the sealing lip and the sealing surface during operation results in a negligible wearing of the sealing element.

From production engineering viewpoints, the wedge guide surface of the retaining groove is advantageously connected to or forms a groove flank of the retaining groove, which groove flank is disposed on the low-pressure side. As a result, the wedge guide surface (jointly with the retaining groove) can be formed directly by the material of the first machine part, or by an insert fastened to the first machine part.

The wedge guide surface and/or a groove floor of the retaining groove, for the purpose of a least possible stick-slip effect or sliding friction of the pretensioning element which bears against the same, can be provided with a, preferably dry-lubricating, antifriction coating. The antifriction coating can be in particular a polymer material, for instance polytetrafluoroethylene, or a metal or metal alloy.

In particular in the case of the wedge guide surface formed by the retaining groove or the first machine part, the pretensioning element can be elastomerically deformable. The pretensioning element here preferably consists of an elastomer.

For a fine adjustment of a basic pretensioning of the sealing lip against the sealing surface in the non-pressurized state of the sealing arrangement, the retaining groove or the first machine part can have an adjusting part for the pretensioning element. The adjusting part can be arranged on the first machine part such that it is shiftable transversely to the motional axis of the two machine parts relative to the second machine part. The pretensioning element, on its groove floor side, is supported against the adjusting part. The adjusting part can be a component separate from the groove floor or can comprise the latter. According to a refinement of the invention, the adjusting part is shiftable by manual or pressure-medium-actuated or electromotive means.

According to a preferred refinement of the invention, the retaining groove has a second groove flank, which is arranged running obliquely to the motional axis. The second groove flank is arranged opposite the first groove flank in the axial direction. As a result, the sealing arrangement can also, given a pressure inversion position between the high-pressure region and the low-pressure region and a, possibly brief, high-pressure-side axial deflection of the pretensioning element from its axial starting position, slide back into this same. The starting position corresponds to the axial position of the pretensioning element relative to the first machine part in the non-pressurized operating state of the sealing arrangement.

The sealing element can be formed of polytetrafluoroethylene or another voscoplastic material, in particular polymer material.

The groove/grooves of the seal-holding structure can widen, in particular in the direction of the motional axis. On the one hand, this allows the sealing element to be pressed in a simplified manner onto the seal-holding structure of the first machine part. In addition, a scoring or shearing-off of the sealing element in the region of a groove edge of the grooves, in the event of forces acting axially on the sealing element, can thereby be prevented.

The sealing element preferredly has one or more slideway portions, on which the second machine part is guided in sliding clearance form fit. The sealing element thereby serves for a mounting of the second machine part. The slideway portion is here supported in the transverse direction to the motional axis such that it bears positively against the first machine part, so that the mounting quality is determined solely by a viscoplastic or elastomeric deformation, but not by a deflection or excursion of the slideway portion in relation to the first machine part. The slide bearing, formed by the slideway portion, for the second machine part can thereby be configured such that it is viscoplastically or elastomerically deformable transversely to the motional axis.

According to a preferred refinement of the invention, the sealing element can have a second sealing lip, which extends axially away from the seal-holding structure in a direction opposite to the first sealing lip. To the second sealing lip can be assigned, in a manner corresponding to the first sealing lip, a pretensioning element disposed in a retaining groove. The second retaining groove, too, can be provided with at least one wedge guide surface.

According to the invention, one of the two machine parts can be configured in particular as a cylinder, and the other of the two machine parts as a piston guided in the cylinder. In this case, the sealing element is configured as an annular radial sealing element.

The sealing arrangement can be used in a large number of different technical tasks. Thus the sealing arrangement can be configured, for instance, as a hydraulic actuator, in particular a cab tilt cylinder, as a vibration damper, or as a shock absorber.

BRIEF DESCRIPTION OF THE DRAWINGS

The invention is explained in greater detail below on the basis of illustrative embodiments represented in the drawings.

In the figures, the illustrative embodiments are represented such that the components fundamental to the invention, as well as their functional interplay, are clearly discernible.

In the drawings:

FIG. 1 shows a sealing arrangement having two machine parts arranged so as to be mutually shiftable, and having a sealing element for sealing off a high-pressure region from a low-pressure region of the sealing arrangement, wherein a sealing lip of the sealing element is pretensionable via a pressure-activatable pretensioning element against the sealing surface of one of the two machine parts;

FIG. 2 shows the sealing arrangement from FIG. 1 when the high-pressure region is pressurized with a first operating pressure $P_1$;

FIG. 3 shows the sealing arrangement from FIG. 1 when the high-pressure region is pressurized with a maximum operating pressure $P_{max}$;

FIG. 4 shows a further illustrative embodiment of the sealing arrangement;

FIG. 5 shows a sealing arrangement having an adjusting part for adjusting a basic pretensioning of the sealing lip against a sealing surface of one of the two machine parts in the non-pressurized state of the sealing arrangement; and FIG. 6 shows a further illustrative embodiment of the sealing arrangement.

DETAILED DESCRIPTION OF THE PREFERRED EMBODIMENTS

Figure 1:
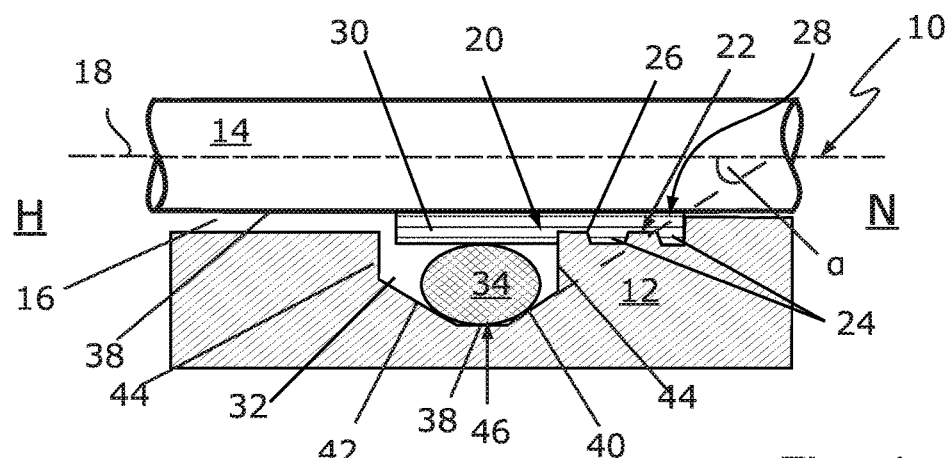

FIG. 1 shows a sealing arrangement 10 having a first machine part 12 and having a second machine part 14, which are arranged at a distance apart with the formation of a sealing gap 16. The two machine parts 12, 14 are translatorily movable relative to each other along a motional axis 18. The first machine part 12 can be configured, for instance, as a cylinder, and the second machine part 14 as a piston guided in the cylinder, as is the case in FIG. 1.

The sealing-off of a high-pressure region H, subjectable to an operating pressure, from a low-pressure region N of the sealing arrangement 10 is taken care of by a sealing element denoted by 20. In the present case, the sealing element 20 is configured as a radial sealing element.

The sealing element 20 is arranged held in a positionally fixed manner in a seal-holding structure 22 of the first machine part 12. In the present case, the seal-holding structure 22 comprises a plurality of grooves 24, into which the sealing element 20 extends. As it is fitted on the first machine part 12, the sealing element 20 is pressed into the grooves 24 of the seal-holding structure 22 and is thereby arranged held permanently in the grooves 24 in a press fit.

As is evident from FIG. 1, the grooves 24 have a cross section which widens in the direction of the motional axis 18. The pressing of the sealing element 20 onto the first machine part 12 is thereby simplified. In addition, an undesirable scoring of the sealing element 20 or a shearing-off of the sealing element 20 in the region of the groove edges 26 of the grooves 24 in the event of forces (not shown) acting axially on the sealing element 20 can thereby be prevented.

In the shown illustrative embodiment, the sealing element 20 additionally serves for the mounting of the second machine part 14 on the first machine part 12 by means of a slide bearing. To this end, the sealing element 20 has a slideway portion 28, on which the second machine part 14 is guided in sliding clearance form fit. The slideway portion 28 covers the seal-holding structure 22 of the first machine part 12 in the radial direction and bears positively against the first machine part 12. The slideway portion of the sealing element 20 is thus supported in the radial direction, over the whole of its longitudinal extent, against the first machine part 12.

The sealing element 20 has a sealing lip 30, which extends away from the seal-holding structure 22 in the axial direction.

The sealing lip 30 extends in the axial direction axially to over a retaining groove 32 of the first machine part 12. The retaining groove 32 is arranged axially distanced from the seal-holding structure 22 of the first machine part 12, and thus also from the slideway portion 28 of the sealing element 20.

In the retaining groove 32 is arranged a pretensioning element 34. The pretensioning element 34 is formed of an elastomerically deformable material, for instance an elastomer. The pretensioning element 34 serves to pretension (press) the sealing lip 30 of the sealing element 18 against a sealing surface 36 of the second machine part 14.

The retaining grooves 32 has a groove floor or groove bottom 38, which in the axial direction is connected by a first wedge guide surface 40 and a second wedge guide surface 42 to groove flanks 44. The groove flanks 44 are oriented such that they run orthogonally to the motional axis 16.

The first and the second wedge guide surface 40, 42 are arranged running obliquely in the axial direction respectively at a uniform angle α, where α<90°, to the motional axis. Of course, the angles α of the two wedge guide surfaces 40, 42 can also differ from each other. The first or the second wedge guide surface can be arranged running obliquely at an angle α, where 20°≤α≤80°, to the sealing surface.

As is evident from FIG. 1, the retaining groove 32 is fluidically connected by the sealing gap 16 to the high-pressure region H of the sealing arrangement 10. The pretensioning element 34 can hence be subjected to an operating pressure of a medium (not shown), which operating pressure respectively prevails in the high-pressure region of the sealing arrangement.

As is shown in FIG. 1, the pretensioning element 34 can have in the non-pressure-loaded state of the sealing arrangement 10 an oval or elliptical or a different, for instance round or polygonal, cross section.

In the present illustrative embodiment, the pretensioning element 34 is dimensioned such that the sealing lip 30, in the non-pressurized state of the sealing arrangement 10 or of the high-pressure region H, bears positively against the sealing surface without a pretensioning (contact pressure). According to an alternative embodiment of the sealing arrangement 10, the pretensioning element 34 can be dimensioned such that the sealing lip 30, in the non-pressurized state of the pretensioning element, is pressed against the sealing surface with a defined basic pretensioning.

In the non-pressurized state, the sealing element 20 is disposed in its axial starting position, denoted by 46, relative to the first machine element 12.

By being subjected on the high-pressure side to the operating pressure, the pretensioning element 34 is movable against and along the first wedge guide surface 40 such that the sealing lip 20 is pretensioned by the pretensioning element 34, with a contact pressing force which is derived from the respective operating pressure (and is thus variable), against the sealing surface 36.

Figure 2:
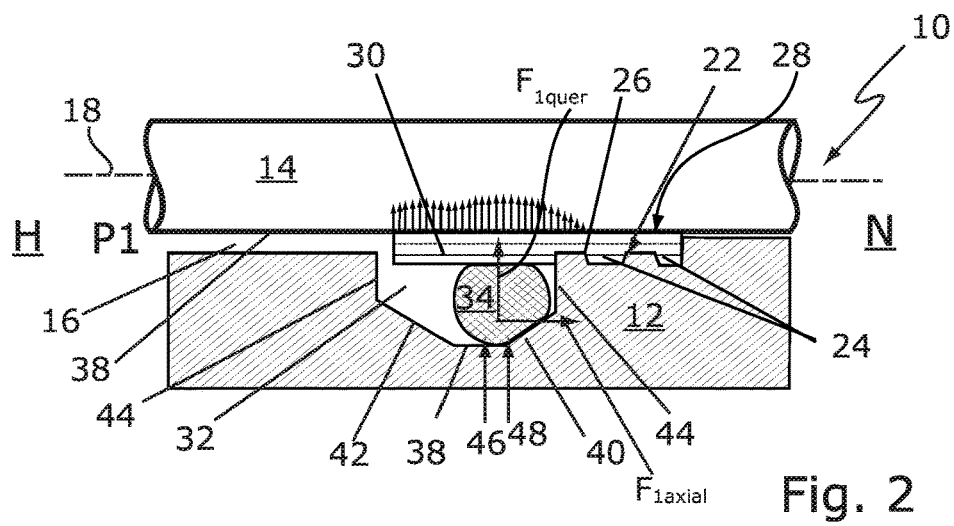

In FIG. 2, the sealing arrangement 10 is shown in a pressurized second operating state, in which the high-pressure region H is subjected to a first operating pressure $P_1$.

As a result of the associated pressurization of the pretensioning element 34, a displacement force $F_{1axial}$ in the direction of the low-pressure region L is exerted on the pretensioning element 34, by which force the pretensioning element 34 is axially displaced from its axial starting position 46 relative to the first machine part 12 into a first working position 48 arranged at a distance therefrom, and, upon contact with the first wedge guide surface 40, is expanded in the radial direction—counter to its inherent elastic restoring force. The pretensioning element thereby forces the sealing lip, with a contact pressing force $F_{1transv}$ derived from the operating pressure $P_1$, against the sealing surface 38 of the second machine part 14. A contact pressure path of the sealing lip 30 against the sealing surface 30 is illustrated with the arrows running orthogonally to the sealing surface 38.

If the operating pressure in the high-pressure region H falls, the elastically deformable pretensioning element 34, due to its inherent natural elasticity, slips back out of its axial position, i.e. out of the working position 48, along the first wedge guide surface 40 axially in the direction of the high-pressure region H, and back out of its axial starting position 46.

Figure 3:
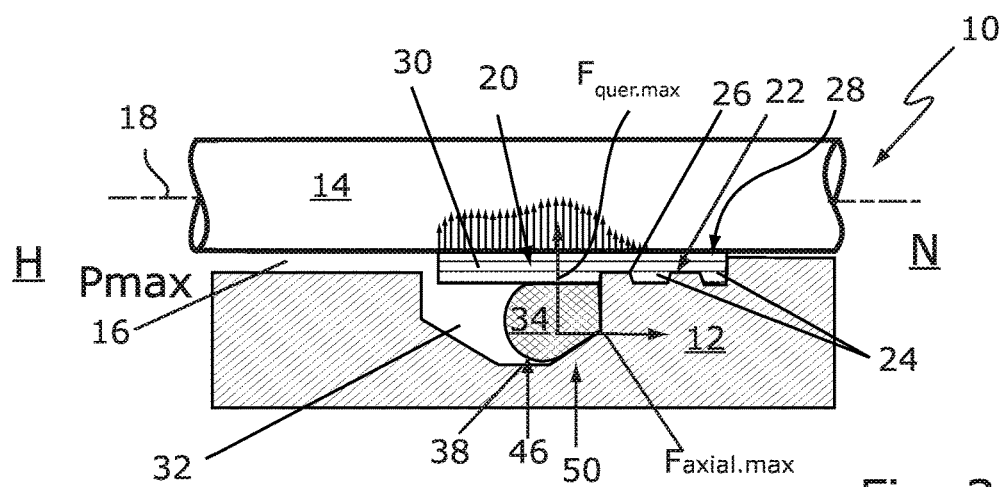

In FIG. 3, the sealing arrangement 10 is shown in a pressurized third operating state, in which the high-pressure region H of the sealing arrangement 10 is subjected to a maximum operating pressure $P_{max}$.

As a result of the associated pressurization of the pretensioning element 34, a maximum displacement force $F_{axial.max}$ in the direction of the low-pressure region L is exerted on the pretensioning element 34, by which force the pretensioning element 34 is axially displaced from its axial starting position 46 relative to the first machine part 12 into a second working position 50 arranged at a distance therefrom, and, upon contact with the first wedge guide surface 40, is expanded in the radial direction—counter to its inherent elastic restoring force. The pretensioning element thereby forces the sealing lip, with a contact pressing force $F_{transv.max}$ derived from the operating pressure $P_{max}$, against the sealing surface 38 of the second machine part 14. The pretensioning element 34 bears against the groove flank 44 disposed on the low-pressure side. A contact pressure path of the sealing lip 30 against the sealing surface 38 is illustrated with the arrows running orthogonally to the sealing surface 38.

If the operating pressure in the high-pressure region H falls, the elastically deformable pretensioning element 34, as explained in connection with FIG. 2, slips back in the direction of the high-pressure region H and its axial starting position 46.

Figure 4:
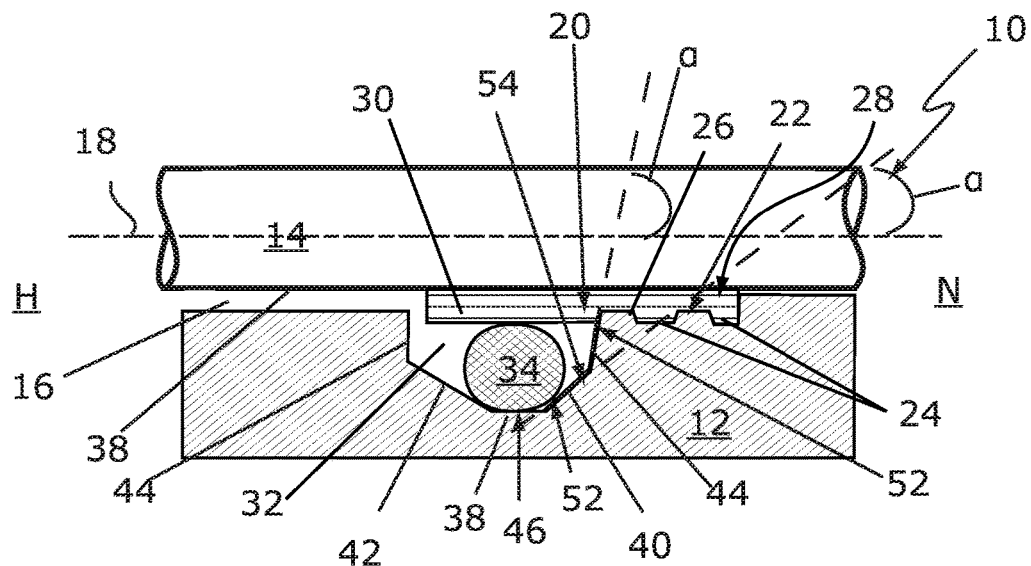

In FIG. 4, a further illustrative embodiment of the sealing arrangement 10 is shown in a partial sectional representation. The first wedge guide surface 40 has two longitudinal portions 52, which are arranged running obliquely with different angles α to the sealing surface. That groove flank 44 of the retaining groove 32 which is disposed on the low-pressure side is formed by one of the longitudinal portions 52 of the first wedge guide surface 40. The first wedge guide surface 42 is thus directly connected to a surface, facing toward the second machine part, of the first machine part 12, or merges into this surface.

In the embodiments described above, the first, and, where appropriate, the second wedge guide surface 40, 42 of the first machine part 12 can be provided with an antifriction coating 54 in order to enable an, as far as possible, low-friction sliding of the pretensioning element 34 on the respective wedge guide surface 40, 42. The antifriction coating 54 can in particular be of dry-lubricating design.

Figure 5:
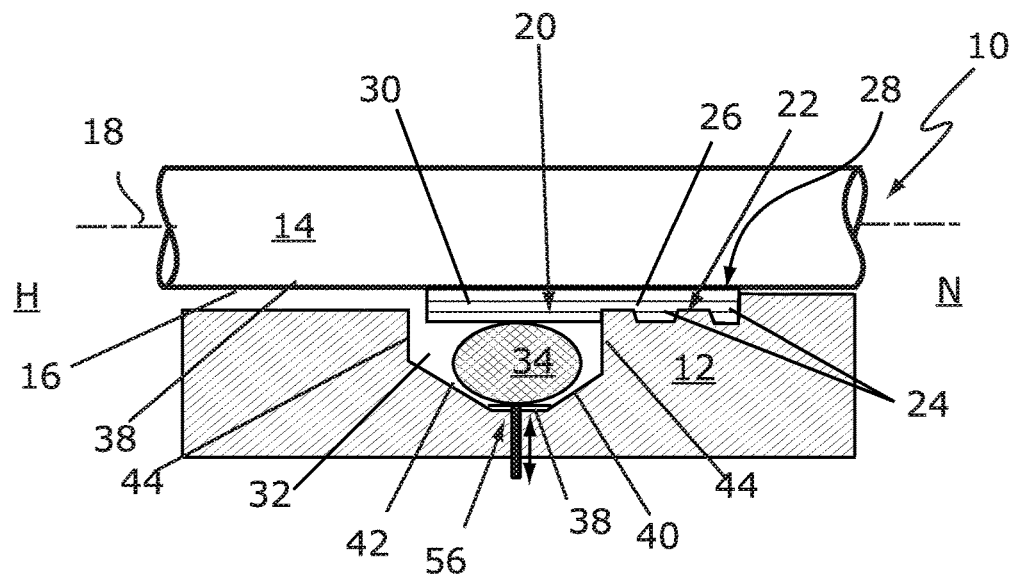

In FIG. 5 is shown a further illustrative embodiment of the sealing arrangement 10, which differs from the illustrative embodiment shown in FIG. 1 substantially in that an adjusting part 56 for the pretensioning element 34 is arranged in the retaining groove 32. The pretensioning element 34 bears against the adjusting part 56. The adjusting part 56 is arranged such that it is shiftable relative to the second machine part 14 transversely to the motional axis 18, i.e. in the present case in a radial direction. By means of the adjusting part 56, a basic pretensioning of the pretensioning element against the sealing lip 30, and thus of the sealing lip 30 against the sealing surface 38, can be set or adjusted.

Figure 6:
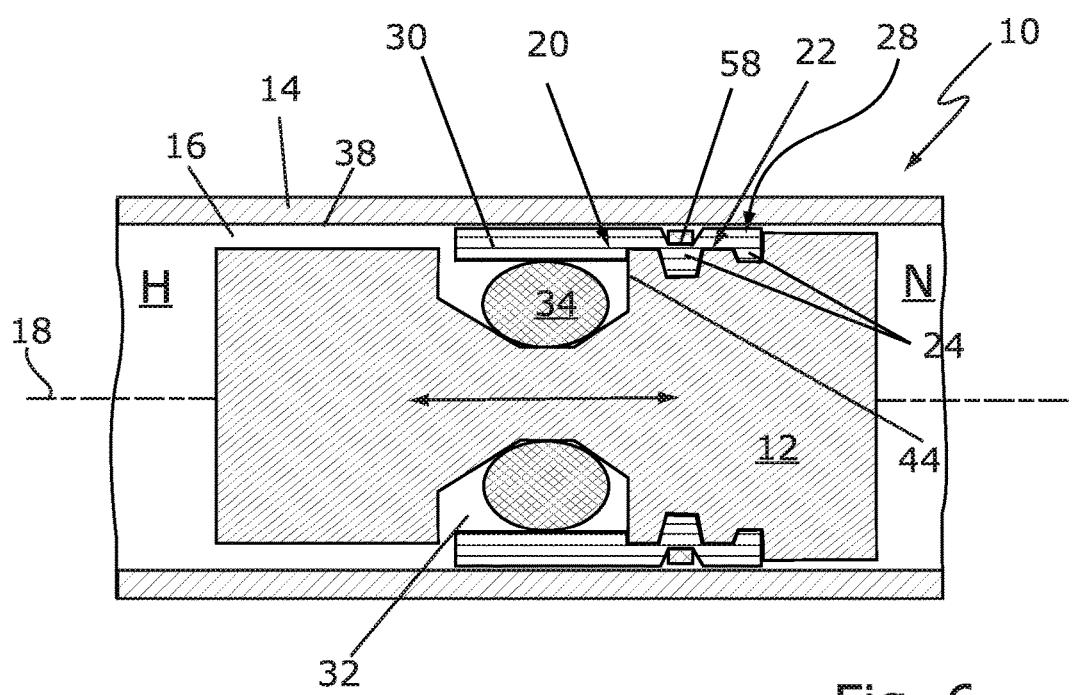

The sealing arrangement according to FIG. 6 differs from the sealing arrangement shown in FIGS. 1 to 3 substantially in that the first machine part 12 is realized as a piston and the second machine part 14 as a cylinder in which the piston is guided in a translatorily shiftable manner along the motional axis 18. The pretensioning element is of annular configuration. The sealing element 20 is realized as a radial sealing element and is fastened by means of a clamping element 58, here a so-called fastening clamp, to the seal-holding structure 22. The clamping element 58 embraces the sealing element 20 from the outside and forces this into one of the grooves 24 of the seal-holding structure 22.

In the sealing arrangements shown in the drawing, the sealing element 20 can be formed, in particular, of polytetrafluoroethylene, or another viscoplastic material.

The sealing arrangements 10 described in connection with FIGS. 1 to 7 can be configured, for instance, as a hydraulic actuator, in particular a cab tilt cylinder, a vibration damper, or as a shock absorber.

What is claimed is:

1. A sealing arrangement comprising:
a first machine part and a second machine part, which are arranged at a distance apart, with the formation of a sealing gap, such that they are movable relative to each other along a motional axis;
a sealing element having a sealing lip, which sealing element is arranged held in a press fit in a plurality of grooves of a seal-holding structure of the first machine part, wherein the sealing lip extends away from the seal-holding structure in the axial direction;
a pretensioning element, which is disposed in a retaining groove of the first machine part and by means of which the sealing lip can be pretensioned against a sealing surface of the second machine part in order to seal off a high-pressure region, which can be subjected to an operating pressure, from a low-pressure region of the sealing arrangement, wherein the pretensioning element is dimensioned such that the sealing element, in the non-pressurized state of the high-pressure region, bears against the sealing surface without a pretensioning;
wherein the retaining groove has a wedge guide surface for the pretensioning element, which wedge guide surface is arranged running obliquely at an angle α, where α<90°, to the motional axis; and
wherein the pretensioning element, by being subjected on the high pressure side to the operating pressure, is movable against and along the wedge guide surface in order to pretension the sealing lip against the sealing surface with a contact pressing force derived from the operating pressure.

2. The sealing arrangement as claimed in claim 1, wherein the wedge guide surface is arranged running obliquely at an angle α, where 20°≤α≤80°, to the sealing surface.

3. The sealing arrangement as claimed in claim 1, wherein the wedge guide surface has at least two longitudinal portions, which are arranged running obliquely, with different angles α1, α2, to the sealing surface.

4. The sealing arrangement as claimed in claim 1, wherein at least the wedge guide surface is provided with a dry-lubricating antifriction coating.

5. The sealing arrangement as claimed in claim 1, wherein the pretensioning element is elastomerically deformable.

6. The sealing arrangement as claimed in claim 1, wherein the retaining groove has disposed within an adjusting part, wherein the adjusting part is configured to press the pretensioning element towards the second machine part, and wherein the adjusting part is arranged such that it is shiftable transversely to the motional axis relative to the second machine part.

7. The sealing arrangement as claimed in claim 1, wherein the sealing element is formed of polytetrafluoroethylene or another viscoplastic material.

8. The sealing arrangement as claimed in claim 1, wherein the grooves widen in the direction of the motional axis.

9. The sealing arrangement as claimed in claim 1, wherein the sealing element has a slideway portion, on which the second machine part is guided in sliding clearance form fit, wherein the slideway portion covers and bears positively and fully against the seal holding structure of the first machine part.

10. The sealing arrangement as claimed in claim 1, wherein one of the two machine parts is configured as a cylinder, and the other of the two machine parts is configured as a piston guided in the cylinder, and wherein the sealing element is an annular radial sealing element.

11. The sealing arrangement as claimed in claim 1, which is configured as a hydraulic actuator for a driver's cab tilt cylinder as a vibration damper or as a shock absorber.

\* \* \* \* \*